(12) United States Patent
Yi et al.

(10) Patent No.: US 9,763,239 B2
(45) Date of Patent: Sep. 12, 2017

(54) DATA TRANSMISSION METHOD AND APPARATUS FOR HALF-DUPLEX DEVICES

(71) Applicant: LG ELECTRONICS INC., Seoul (KR)

(72) Inventors: Yun Jung Yi, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 14/373,874

(22) PCT Filed: Jan. 29, 2013

(86) PCT No.: PCT/KR2013/000708
§ 371 (c)(1),
(2) Date: Jul. 22, 2014

(87) PCT Pub. No.: WO2013/112030
PCT Pub. Date: Aug. 1, 2013

(65) Prior Publication Data
US 2015/0029905 A1 Jan. 29, 2015

Related U.S. Application Data

(60) Provisional application No. 61/591,962, filed on Jan. 29, 2012.

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/0026* (2013.01); *H04L 1/0027* (2013.01);
(Continued)

(58) Field of Classification Search
CPC .. H04W 72/042; H04W 74/0833; H04L 5/16; H04L 5/0055; H04L 1/0026; H04L 1/0027; H04L 1/1854
See application file for complete search history.

(56) References Cited

U.S. PATENT DOCUMENTS 8,145,271 B2 * 3/2012 Ishii ................. H04W 72/1242
370/336
8,498,228 B2 * 7/2013 Lee ....................... H04L 1/1854
370/310
(Continued)

FOREIGN PATENT DOCUMENTS

| JP | 2011-019258 | 1/2011 |
| KR | 10-2005-0013634 | 2/2005 |
| KR | 10-2009-0017612 | 2/2009 |

OTHER PUBLICATIONS

Ericsson, et al., "Half Duplex FDD in LTE," TSG-RAN WG1 #51bis, R1-080534, Jan. 2008, 4 pages.
(Continued)

*Primary Examiner* — Phuc Tran
(74) *Attorney, Agent, or Firm* — Lee Hong Degerman Kang Waimey

(57) ABSTRACT

The present invention relates to a data transmission method for a half-duplex device in a wireless communication system. The half-duplex device transmits first uplink data to a base station in an n-th subframe. The half-duplex device determines whether to receive downlink data which is a response to the first uplink data from the base station in an (n+r)-th (where r>1) subframe or to transmit second uplink data to the base station.

7 Claims, 14 Drawing Sheets

(51) Int. Cl.
*H04L 1/00* (2006.01)
*H04L 1/18* (2006.01)
*H04L 5/00* (2006.01)
*H04L 5/16* (2006.01)
*H04W 74/08* (2009.01)

(52) U.S. Cl.
CPC .......... *H04L 1/1854* (2013.01); *H04L 5/0055* (2013.01); *H04L 5/16* (2013.01); *H04W 74/0833* (2013.01)

(56) References Cited

U.S. PATENT DOCUMENTS

| | | | |
|---|---|---|---|
| 8,743,721 B2 * | 6/2014 | Astely | H04L 1/1635 370/252 |
| 2009/0135748 A1 * | 5/2009 | Lindoff | H04W 72/048 370/296 |
| 2012/0155436 A1 * | 6/2012 | Lindoff | H04W 72/1257 370/336 |
| 2014/0204812 A1 * | 7/2014 | Li | H04W 72/042 370/280 |

OTHER PUBLICATIONS

PCT International Application No. PCT/KR2013/000708, Written Opinion of the International Searching Authority dated May 16, 2013, 1 page.

\* cited by examiner

DATA TRANSMISSION METHOD AND APPARATUS FOR HALF-DUPLEX DEVICES

CROSS-REFERENCE TO RELATED APPLICATIONS

This application is the National Stage filing under 35 U.S.C. 371 of International Application No. PCT/KR2013/000708, filed on Jan. 29, 2013, which claims the benefit of U.S. Provisional Application Ser. No. 61/591,962, filed on Jan. 29, 2012, the contents of which are all hereby incorporated by reference herein in their entirety.

BACKGROUND OF THE INVENTION

Field of the Invention

The present invention relates to wireless communications, and more particularly, to a data transmission method and apparatus for a half-duplex device in a frequency division duplex (FDD) system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. In recent years, there is an ongoing discussion on 3GPP LTE-advanced (LTE-A) evolved from the 3GPP LTE.

A communication channel between a base station (BS) and a user equipment (UE) is roughly divided into a downlink (DL) channel directed from the BS to the UE and an uplink (UL) channel directed from the UE to the BS.

A method of transmitting data in a 3GPP LTE and LTE-A system employs a frequency division duplex (FDD) scheme and a time division duplex (TDD) scheme. In the FDD scheme, a UL transmission and a DL transmission are achieved simultaneously while occupying different frequency bands. In the TDD scheme, the UL transmission and the DL transmission are achieved at different times while occupying the same frequency band.

In order for the UE to simultaneously perform the UL transmission and the DL transmission, a full-duplex capability is required. Comparing with a full-duplex device, a UE which cannot simultaneously perform the UL transmission and the DL transmission is called a half-duplex device. The half-duplex device advantageously has a lower hardware complexity and is cheaper than the full-duplex device. In particular, like a machine type communication (MTC) device, in a case where transmission data and reception data are different in size, and the transmission data is significantly greater in size than the reception data, the half-duplex device is cost effective.

However, it is assumed that a BS and a UE basically have the full-duplex capability in the FDD scheme of the 3GPP LTE and LTE-A system, and the BS can schedule the UE to simultaneously perform a UL transmission and a DL reception at a specific time. In the above case, the half-duplex device has to select one of the UL transmission and the DL reception while giving up the other transmission. Accordingly, a data transmission method for the half-duplex device is required.

SUMMARY OF THE INVENTION

The present invention provides a data transmission method for a half-duplex device in a frequency division duplex (FDD) system, and an apparatus using the method.

In an embodiment in accordance with the present invention, a data transmission method for a half-duplex device in a wireless communication system is provided. The method includes transmitting, by the half-duplex device, first uplink (UL) data to a base station (BS) in an n-th subframe, and determining, by the half-duplex device, whether to receive downlink (DL) data from the BS in an (n+r)-th subframe, where r>1, or to transmit second UL data to the BS. The DL data is a response for the first UL data.

If the DL data includes an acknowledgement (ACK)/negative acknowledgement (NACK) signal for the first UL data and the second UL data includes channel state information (CSI) reporting, the half-duplex device may determine to receive the DL data in the (n+r)-th subframe.

If the first UL data includes a random access preamble and the DL data includes a random access response and the second UL data includes CSI reporting, the half-duplex device may determine to receive the DL data in the (n+r)-th subframe.

If the DL data includes an ACK/NACK signal for the first UL data and the second UL data includes a random access preamble, the half-duplex device may determines to transmit the second UL data in the (n+r)-th subframe.

In another embodiment in accordance with the present invention, a data transmission method for a half-duplex device in a wireless communication system is provided. The method includes transmitting, by the half-duplex device, first downlink (DL) data from a base station (BS) in an n-th subframe, and determining, by the half-duplex device, whether to transmit uplink (UL) data to the BS in an (n+r)-th subframe, where r>1, or to receive second UL data from the BS. The UL data is generated based on the first DL data.

If the second DL data includes system information, the half-duplex device may determine to receive the second DL data in the (n+r)-th subframe.

In still another embodiment in accordance with the present invention, a half-duplex device in a wireless communication system is provided. The device includes a radio frequency (RF) unit configured to transmit and receive a radio signal, and a processor operatively coupled to the RF unit and configured to transmitting first uplink (UL) data to a base station (BS) in an n-th subframe, and determining whether to receive downlink (DL) data from the BS in an (n+r)-th subframe, where r>1, or to transmit second UL data to the BS. The DL data is a response for the first UL data.

Radio resource scheduling of a base station can be performed in a flexible manner.

A capability of a half-duplex device is improved.

DESCRIPTION OF EXEMPLARY EMBODIMENTS

A technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

For clarity, the following description will focus on the 3GPP LTE based on 3GPP Release 8. However, the technical features of the present invention are not limited thereto.

Figure 1:
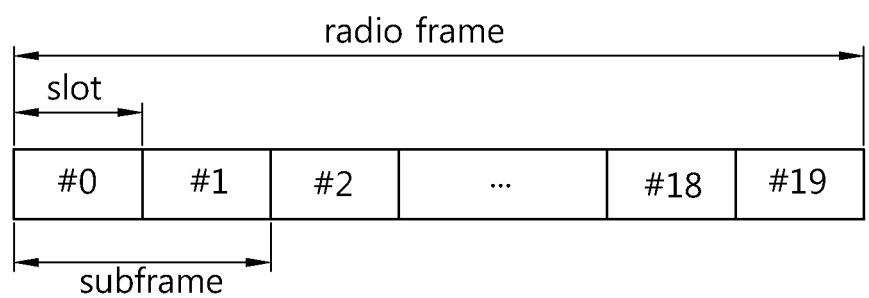
FIG. 1 shows a structure of a radio frame in $3^{rd}$ generation partnership project (3GPP) long term evolution (LTE).

FIG. 1 shows a structure of a radio frame of a radio frame in the 3GPP LTE.

The section 5 of 3GPP TS 36.211 V10.3.0 (2011-09) "Technical Specificaation Group Radio Access Network; Evolved Universal Terrestrial Radio Access (E-UTRA); Physical Channels and Modulation (Release 10)" may be incorporated herein by reference.

Referring to FIG. 1, a radio frame includes 10 subframes. One subframe include two consecutive slots. Slots in the radio frame are indexed from 0 to 19. One subframe may have a length of 1 millisecond (ms). A time required for transmitting one subframe is defined as a transmission time interval (TTI). A TTI is a basic for scheduling. For example, one radio may have a length of 10 ms, one subframe may have a length of 1 ms and one slot may have a length of 0.5 ms.

One slot may include a plurality of orthogonal frequency division multiplexing (OFDM) symbols in time domain and a plurality of subcarriers in frequency domain. A OFDM symbol is only for expressing one symbol period in the time domain since the 3GPP LTE used OFDMA as multiple access scheme. There is no limitation in a multiple access scheme or terminologies. For example, the OFDM symbol may also be referred to as another terminology such as a single carrier frequency division multiple access (SC-FDMA) symbol when SC-FDMA is used as uplink multiple access scheme. A resource block (RB) is a unit of resource allocation and includes a plurality of consecutive subcarriers in one slot.

The structure of the radio frame shown in FIG. 1 is for exemplary purposes only. Thus the number of subframes included in the radio frame or the number of slots included in the subframe, and the number of OFDM symbols included in the slot may change variously. According to 3GPP LTE, in case of a normal CP, one subframe includes 7 OFDM symbols, and in case of an extended CP, one subframe includes 6 OFDM symbols.

Figure 2:
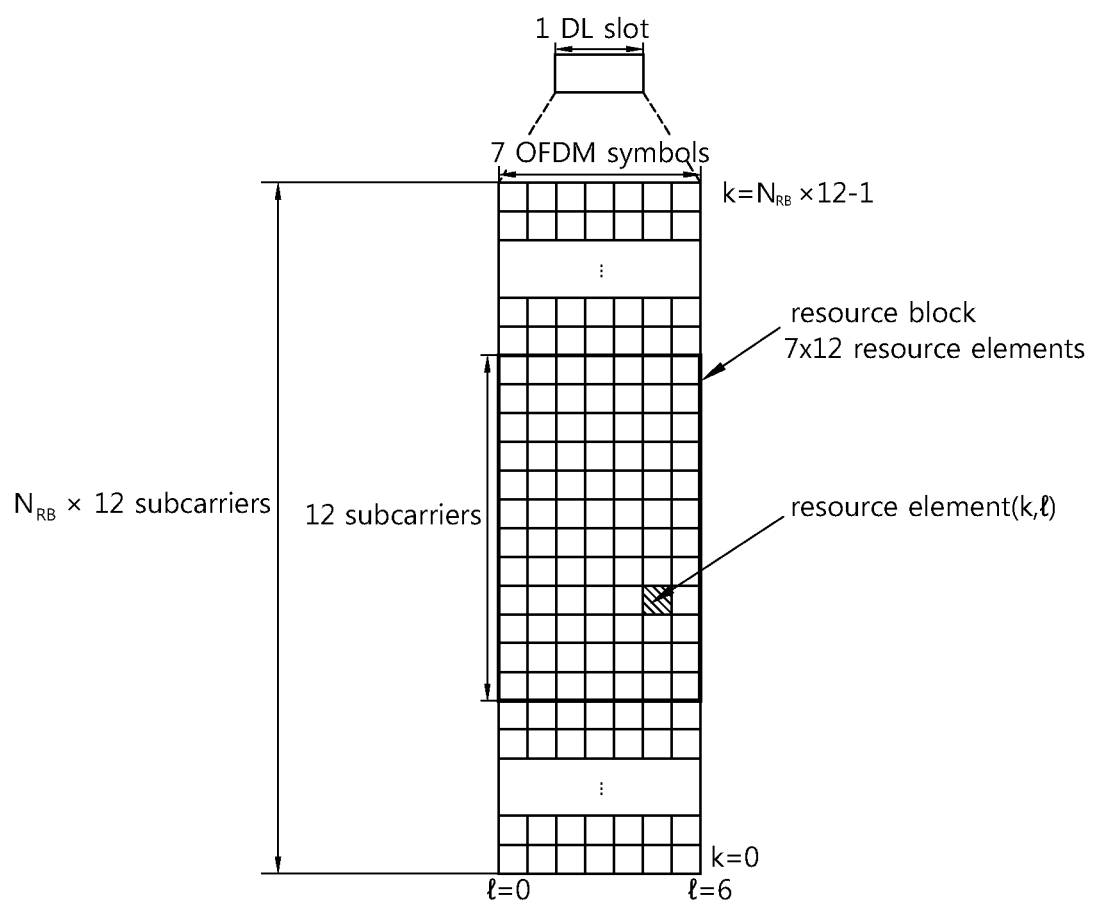
FIG. 2 shows an example of a resource grid for one downlink (DL) slot.

FIG. 2 shows an example of a resource grid for one downlink slot.

A DL slot may include a plurality of OFDM symbols in time domain and $N_{RB}$ RBs. A value of $N_{RB}$ may depend on a DL transmission bandwidth configured at a cell. For example, $N_{RB}$ may 6-110 in the LTE system. One RB includes a plurality of subcarriers. A structure of a UL slot may be same as the structure of the DL slot.

Each element on a resource grid may be referred as a resource element. A resource element on the resource grid may be identified by an index pair (k,l) in a slot, where k is a subcarrier index, k=0, . . . , $N_{RB}$x12-1 and l is a OFDM symbol index, l=0, . . . , 6.

For example, if one slot includes 7 OFDM symbols in a time domain and an RB includes 12 subcarriers in a frequency domain, one RB can include 84 resource elements (REs).

Figure 3:
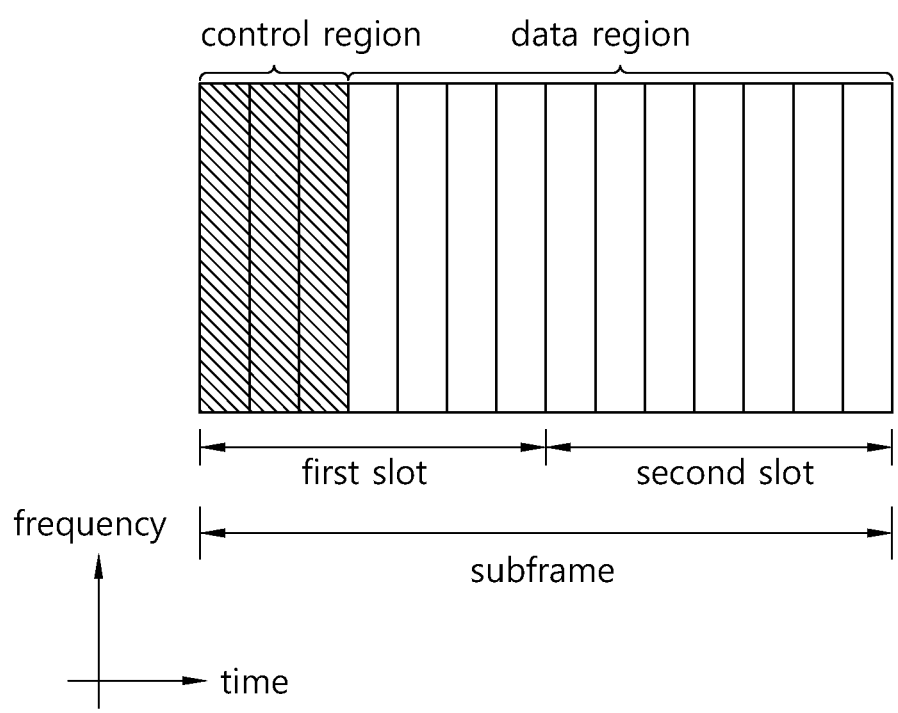
FIG. 3 shows a structure of a DL subframe.

FIG. 3 shows a structure of a DL subframe.

A DL subframe is divided into a control region and a data region in time domain. The control region includes up to three preceding OFDM symbols of a 1st slot in the subframe. The number of OFDM symbols included in the control region may vary. A PDCCH is allocated to the control region, and a PDSCH is allocated to the data region.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., physical downlink control channel (PDCCH), physical control format indicator channel (PCFICH), physical hybrid-ARQ indicator channel (PHICH) and physical uplink control channel (PUCCH).

The PCFICH transmitted in the first OFDM symbol of the subframe carries a control format indicator (CFI) indicating the number of OFDM symbols (i.e., a size of the control region) used in transmission of control channels in the subframe. A UE first receives the CFI over the PCFICH, and thereafter monitors the PDCCH.

Unlike the PDCCH, the PCFICH does not use blind decoding and is transmitted in a fixed PCFICH resource of a subframe.

The PHICH carries a positive-acknowledgement (ACK)/negative-acknowledgement (NACK) signal for uplink hybrid automatic repeat request (HARQ). The ACK/NACK signal for UL data on the PUSCH transmitted by the UE is transmitted on the PHICH.

PBCH is transmitted in first four OFDM symbol of a second slot of a first subframe in a radio frame. PBCH carries essential system information to communicate between a UE and a BS. The system information on the PBCH may be referred as a master information block (MIB). System information on PDSCH indicated by a PDCCH0 may be referred as a system information block (SIB).

Control information transmitted through the PDCCH is referred to as downlink control information (DCI). The DCI may include a PDSCH resource allocation (referred to as a DL grant), a PUSCH resource allocation (referred to as a UL grant), a set of transmit power control commands for individual UEs in any UE group, and/or activation of a voice over Internet protocol (VoIP).

In 3GPP LTE, blind decoding is used to detect a PDCCH. A cyclic redundancy check (CRC) of a received PDCCH (i.e. a candidate PDCCH) is demasked with an identifier. By checking the CRC error, the UE can confirm whether the candidate PDCCH is UE's PDCCH.

The BS determined PDCCH format in accordance with DCI to be sent. CRC is added to the DCI and a unique identifier (i.e., cell-radio network temporary identifier (RNTI)) is masked to the CRC according to PDCCH's owner or PDCCH's use.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined A REG may include 4 RE, and a CCE may include 9 REG. A PDCCH may be composed of L CCEs. L is a CCE aggregation level and is an element of {1, 2, 3, 8}.

A number of CCEs for a PDCCH can be determined based on a channel state. For example, only one CCE can be utilized for a UE having good DL channel state. 8 CCEs can be utilized for a UE having poor DL channel state.

An interleaving may be performed to a control channel composed of one or more CCEs in unit of REG. Then, cyclic shift based on a cell identifier is performed to the control channel and resource mapping is performed.

Figure 4:
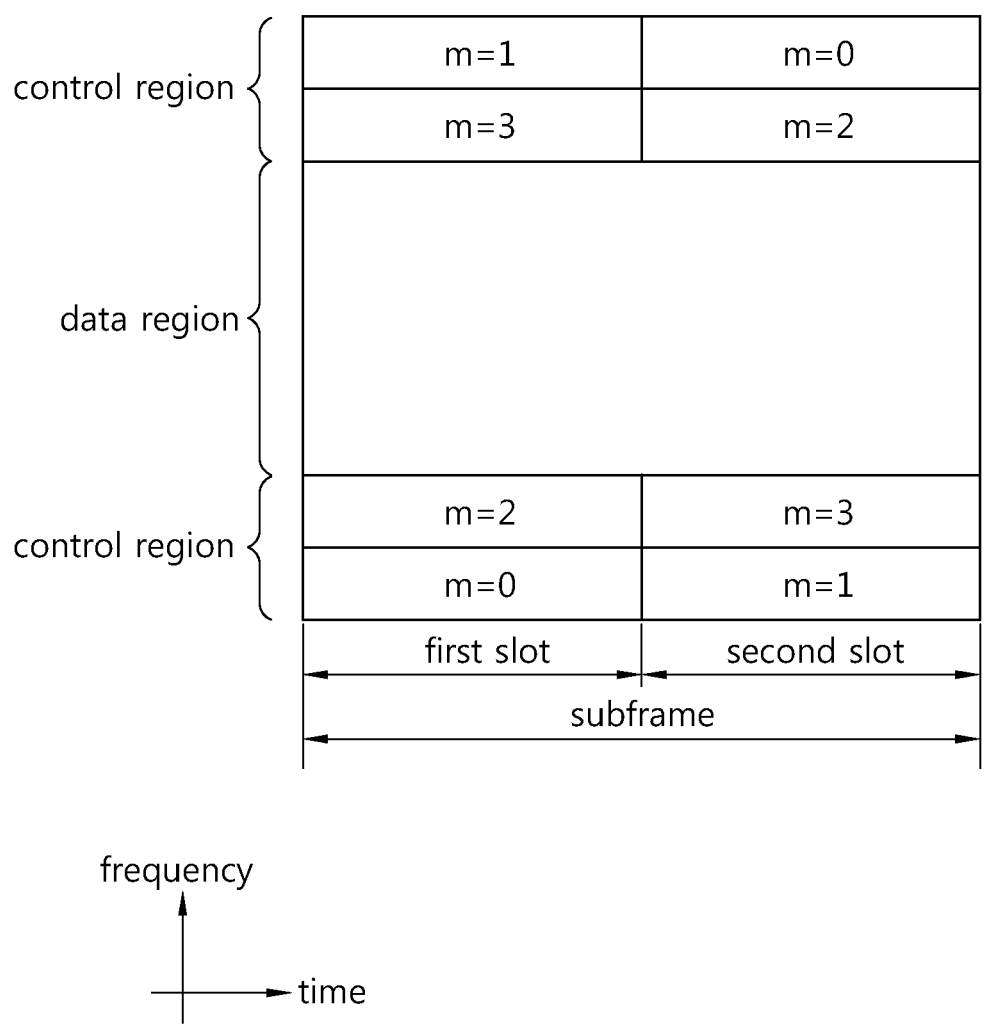
FIG. 4 shows a structure of an uplink (UL) subframe.

FIG. 4 shows a structure of an uplink (UL) subframe.

A UL subframe can be divided into a control region to which a physical uplink control channel (PUCCH) carrying uplink control information is allocated and a data region to which a physical uplink shared channel (PUSCH) carrying uplink data is allocated.

A PUCCH for a UE is allocated in a pair of resource blocks in a subframe. Resources blocks belonging to the RB-pair occupy different subcarriers in a first slot and a second slot. A frequency occupied by a RB in the RB-pair is changed at slot boundary. This is called as frequency hopping at slot boundary. Frequency diversity gain is obtained since uplink control information is transmitted in different subcarriers. 'm' is a position index indicating a logical frequency region position of the resource block pair, allocated to PUCCHs within the uplink subframe.

Uplink control information on the PUCCH includes HARQ ACK, CQI (channel quality indicator) representing a downlink channel state, a scheduling request for requesting a uplink resource assignment, etc.

Meanwhile, there is a growing demand on a high data transfer rate. Therefore, a carrier aggregation (CA) supporting a plurality of cells can be applied in 3GPP LTE-A. The CA may also be referred to as other terms such as a bandwidth aggregation, or the like. The CA implies a system which configures a wideband by aggregating one or more carriers having a bandwidth smaller than that of a desired wideband when the wireless communication system intends to support the wideband. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A plurality of base stations (BSs) and user equipments (UEs) may communicate with each other through up to 5 cells. The 5 cells may correspond to a bandwidth of up to 100 MHz. That is, a CA environment indicates a case where a specific UE has two or more configured serving cells (hereinafter, simply referred to as cells) having different carrier frequencies. The carrier frequency indicates a center frequency of the cell.

The cell indicates a combination of a DL resource and optionally a UL resource. That is, the cell must include the DL resource, and may optionally include the UL resource to be combined with the DL resource. The DL resource may be a DL component carrier (CC). The UL resource may be a UL CC. If a specific UE has one configured serving cell, it may have one DL CC and one UL CC. If the specific UE has two or more cells, the number of DL CC may be equal to the number of cells or the number of UL CCs may be less than or equal to the number of cells. That is, if the CA is supported in the current 3GPP LTE-A, the number of DL CCs may always be greater than or equal to the number of UL CCs. However, in a release later than 3GPP LTE-A, it may be supported a CA in which the number of DL CCs is less than the number of UL CCs.

A linkage between a carrier frequency of a DL CC and a carrier frequency of a UL CC may be indicated by system information transmitted on the DL CC. The system information may be a system information block type2 (SIB2).

Figure 5:
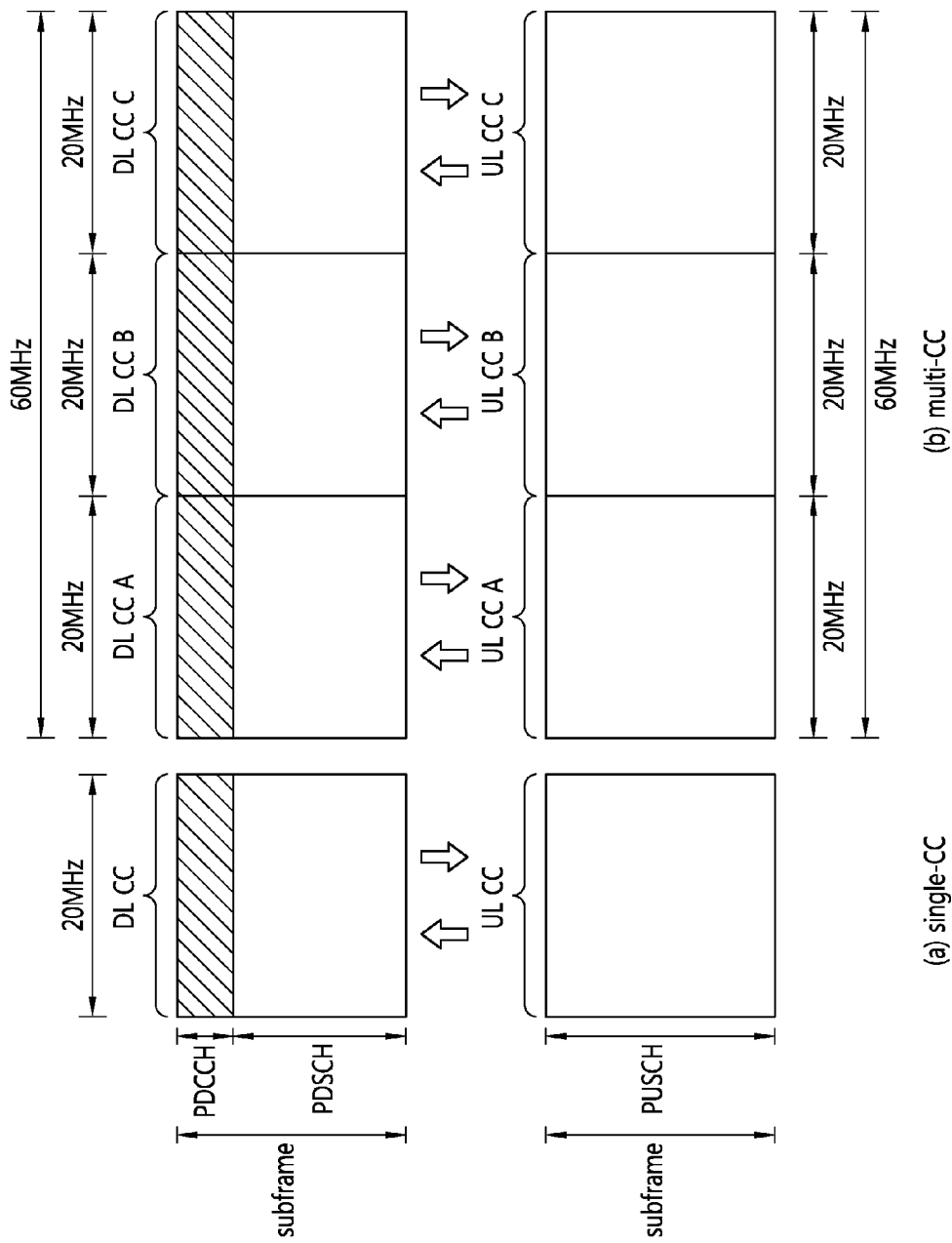
FIG. 5 shows an example of a subframe structure of a single-carrier system and a carrier aggregation system.

FIG. 5 shows an example of a subframe structure of a single-carrier system and a carrier aggregation system.

FIG. 5-(a) shows a single-carrier system. It is assumed in FIG. 5-(a) that a system bandwidth is 20 MHz. Since the number of carriers is 1, a bandwidth of a DL CC transmitted by a BS and a bandwidth of a UL CC transmitted by a UE are also 20 MHz. The BS performs a DL transmission through the DL CC, and the UE performs a UL transmission through the UL CC.

FIG. 5-(b) shows a carrier aggregation system. It is assumed in FIG. 5-(b) that a system bandwidth is 60 MHz. A DL bandwidth consists of a DL CC A, a DL CC B, and a DL CC C, each of which has a bandwidth of 20 MHz. A UL bandwidth consists of a UL CC A, a UL CC B, and a UL CC C, each of which has a bandwidth of 20 MHz. ABS performs a DL transmission through the DL CC A, the DL CC B, and the DL CC C, and the UE performs the DL transmission through the UL CC A, the UL CC B, and the UL CC C. The DL CC A and the UL CC A, the DL CC B and the UL CC B, and the DL CC C and the UL CC C may correspond to each other.

As the CA environment is introduced, cross carrier scheduling may be applied. Through the cross carrier scheduling, a PDCCH on a specific DL CC may schedule a PDSCH on any one DL CC among a plurality of DL CCs, and may schedule a PUSCH on any one UL CC among a plurality of UL CCs. For the cross carrier scheduling, a carrier indicator field (CIF) may be defined. The CIF may be included in a DCI format transmitted on the PDCCH. Whether the CIF exists in the DCI format may be indicated semi-statically or UE-specifically by a higher layer. When the cross carrier scheduling is performed, the CIF may indicate a DL CC in which the PDSCH is scheduled or a UL CC in which the PUSCH is scheduled. The CIF may be fixed to 3 bits, or may exist at a fixed position irrespective of a size of the DCI format. If the CIF does not exist in the DCI format, a PDCCH on a specific DL CC may schedule a PDSCH on the same DL CC or may schedule a PUSCH on a UL CC linked to the specific DL CC using the SIB2.

If the cross carrier scheduling is performed by using the CIF, the BS may allocate a PDCCH monitoring DL CC set to decrease a blind decoding complexity of the UE. The PDCCH monitoring DL CC set is a part of the entire DL CC, and the UE performs blind decoding only for a PDCCH in the PDCCH monitoring DL CC set. That is, in order to schedule the PDSCH and/or the PUSCH with respect to the UE, the BS may transmit the PDCCH only through a DL CC in the PDCCH monitoring DL CC set. The PDCCH monitoring DL CC set may be configured in a UE specific, a UE group specific, or a cell specific manner.

Figure 6:
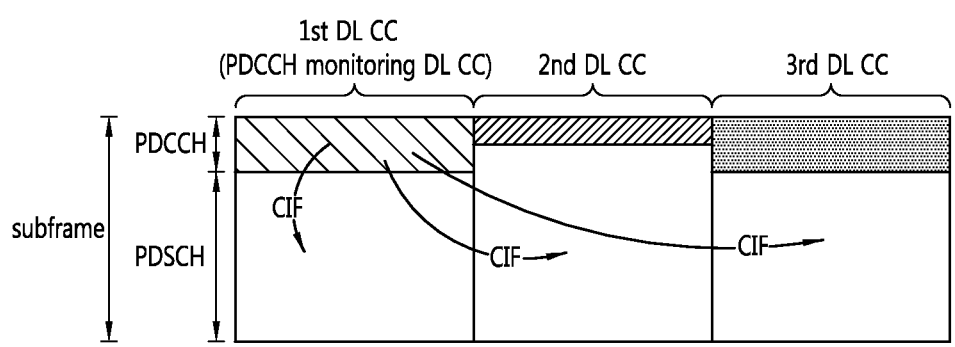
FIG. 6 shows an example of a subframe structure of a 3GPP LTE-advanced (A) system in which cross carrier scheduling is performed using a carrier indicator field (CIF).

FIG. 6 shows an example of a subframe structure of a 3GPP LTE-A system in which cross carrier scheduling is performed using a CIF.

Referring to FIG. 6, among 3 DL CCs, a $1^{st}$ DL CC is configured as a PDCCH monitoring DL CC. If the cross carrier scheduling is not performed, each DL CC schedules the PDSCH by transmitting each PDCCH. If the cross carrier scheduling is performed, only the $1^{st}$ DL CC configured as the PDCCH monitoring DL CC transmits the PDCCH. The PDCCH transmitted on the $1^{st}$ DL CC uses the CIF to schedule not only the PDSCH of the $1^{st}$ DL CC but also a PDSCH of a $2^{nd}$ DL CC and a $3^{rd}$ DL CC. The $2^{nd}$ and $3^{rd}$ DL CCs which are not configured as the PDCCH monitoring DL CC do not transmit the PDCCH.

In addition, the UE may transmit channel state information (CSI) received, detected, or measured from one or more DL CCs, UL control information such as ACK/NACK, etc., to the BS through predetermined one UL CC. The CSI may include a CQI, a PMI, an RI, etc. For example, if the UE needs to transmit an ACK/NACK signal for data received from a plurality of DL CCs, the UE may transmit a plurality of ACK/NACK signals for data received from the respective DL CCs by performing multiplexing or bundling thereon to the BS through a PUCCH of a UL CC of a PCell. In 3GPP LTE, it is necessary to transmit the ACK/NACK signal for the DL CC in the following three cases.

1) An ACK/NACK signal for a PDSCH transmission indicated by a corresponding PDCCH in a subframe (n−k) may be transmitted in a subframe n. Herein, k∈K, where K is a set of M elements $\{k_0, k_1, \ldots, k_{M-1}\}$ based on the subframe n and the UL/DL configuration. This is a case where the ACK/NACL signal is transmitted for a normal PDSCH.

2) An ACK/NACK signal for a PDCCH of a subframe (n−k) indicating a release of DL semi-persistent scheduling (SPS) may be transmitted in a subframe n. Herein, k∈K, where K is a set of M elements $\{k_0, k_1, \ldots, k_{M-1}\}$ based on the subframe n and the UL/DL configuration. An ACK/NACK signal for a PDCCH indicating an activation of the DL SPS is not transmitted.

3) An ACK/NACK signal for a PDSCH transmission without a corresponding PDCCH in a subframe (n−k) may be transmitted in a subframe n. Herein, k∈K, where K is a set of M elements $\{k_0, k_1, \ldots, k_{M-1}\}$ based on the subframe n and the UL/DL configuration. This is a case where the ACK/NACK signal for the SPS is transmitted.

In the aforementioned description, K denotes a bundling window. That is, the bundling window refers to one or more DL subframes corresponding to an ACK/NACK signal in one UL subframe. In an FDD system, M=1, and K={k0}={4}.

Meanwhile, a method of transmitting data in a 3GPP LTE and LTE-A system employs a frequency division duplex (FDD) scheme and a time division duplex (TDD) scheme. In the FDD scheme, a UL transmission and a DL transmission are achieved simultaneously while occupying different frequency bands. In the TDD scheme, the UL transmission and the DL transmission are achieved at different times while occupying the same frequency band.

In order for the UE to simultaneously perform the UL transmission and the DL transmission, a full-duplex capability is required. Comparing with a full-duplex device, a UE which cannot simultaneously perform the UL transmission and the DL transmission is called a half-duplex device. The half-duplex device advantageously has a lower hardware complexity and is cheaper than the full-duplex device. In particular, like a machine type communication (MTC) device, in a case where transmission data and reception data are different in size, and the transmission data is significantly greater in size than the reception data, the half-duplex device is cost effective.

It is assumed that a BS and a UE basically have the full-duplex capability in the FDD scheme of the 3GPP LTE and LTE-A system, and the BS can schedule the UE to simultaneously perform a UL transmission and a DL reception at a specific time. In the above case, the half-duplex device has to select one of the UL transmission and the DL reception while giving up the other transmission. In order to avoid overlapping of a UL transmission and a DL reception of the half-duplex device, a BS may allocate a radio resource on the basis of a UE capability. However, if a great number of UEs are located in a serving cell similarly to an MTC system, it is impossible or ineffective for the BS to allocate a radio resource by considering all half-duplex devices. Therefore, the present invention considers each importance when the half-duplex device selects one of a UL transmission and a DL transmission at a specific time. By using the aforementioned method, the BS can flexibly perform radio resource scheduling, and can minimize a damage caused when the half-duplex device gives up one of the transmission.

Hereinafter, for convenience of explanation, a UL pattern and a DL pattern are shown by being combined into one pattern in embodiments described below. That is, if a UL subframe and a DL subframe are located in the same time domain, although the two subframes are located in different frequency domains, they are shown as one subframe.

Figure 7:
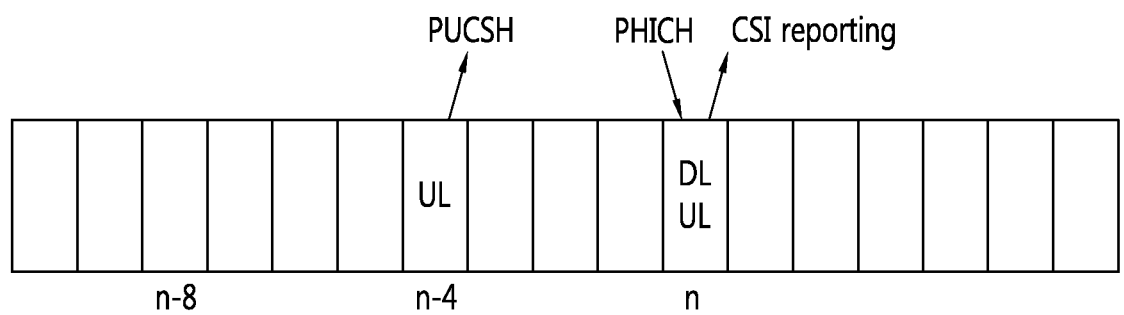
FIG. 7 shows an example in which an acknowledgement (ACK)/negative acknowledgement (NACK) reception and a channel state information (CSI) reporting transmission are scheduled at the same time.

FIG. 7 shows an example in which an ACK/NACK reception and a CSI reporting transmission are scheduled at the same time.

When a UE transmits a CSI acquired from a DL CC to a BS, it is called CSI reporting of CSI feedback. The CSI reporting may be classified into aperiodic CSI reporting and periodic CSI reporting. In LTE release 10, the periodic CSI reporting is transmitted using PUCCH formats 2/2a/2b.

Referring to FIG. 7, the UE transmits a PUSCH in an $(n-4)^{th}$ UL subframe. The PUSCH may be scheduled on the basis of an SPS or a UL grant acquired in an $(n-8)^{th}$ DL subframe. The UE may expect to receive ACK/NACK for the PUSCH in an $n^{th}$ DL subframe.

Apart from this, the CSI reporting may be scheduled in an $n^{th}$ UL subframe. If the CSI reporting is aperiodic CSI reporting, the BS schedules the CSI reporting by using a UL DCI format or a random access response grant. If the CSI reporting is periodic CSI reporting, the UE is semi-statically configured by a higher layer and periodically feeds back the CSI.

That is, the HARQ received through a DL channel and the CSI reporting transmitted through a UL channel may be scheduled at the same time. If the UE is a full-duplex device, the HARQ reception and the CSI reporting may be performed simultaneously. However, if the UE is a half-duplex device, only one of the HARQ reception and the CSI reporting may be performed.

If the BS can consider all possible cases so that such a collision does not occur in half-duplex devices, the aforementioned problem does not occur. However, as described above, if a plurality of half-duplex devices are present in a cell and there are many periodic scheduling operations such as periodic CSI reporting, SPS, etc., it may be impossible for the BS to schedule all of the half-duplex device or, if so, it requires a great overhead. Therefore, in such a case, the half-duplex device is preferably allowed to select one of a UL transmission and a DL reception.

In case of FIG. 7, ACK/NACK transmitted from the BS is relatively more important than the CSI reporting. Therefore, the half-duplex device may be configured such that a PHICH has a higher priority than a PUCCH, and may receive the PHICH through a downlink at a corresponding time.

Figure 8:
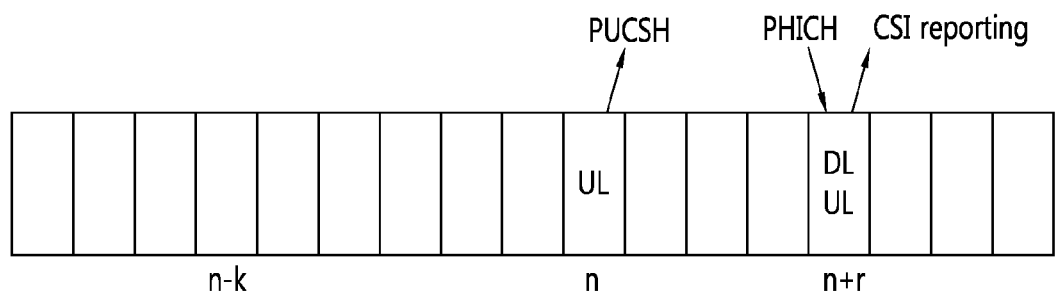
FIG. 8 shows an example in which a random access response (RAR) reception and a CSI reporting transmission are scheduled at the same time.

FIG. 8 shows an example in which a random access response (RAR) reception and a CSI reporting transmission are scheduled at the same time.

Figure 9:
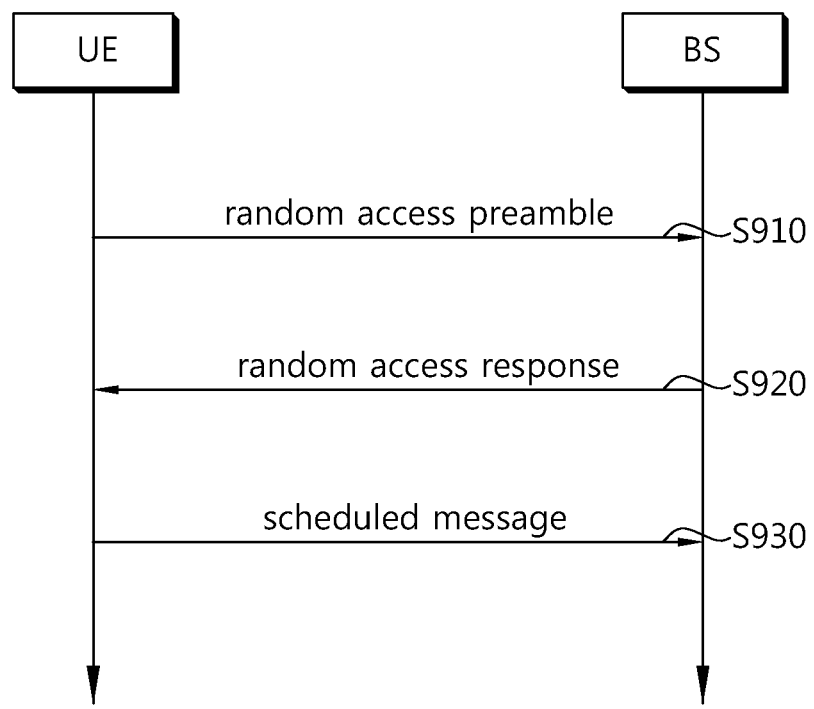
FIG. 9 is a flowchart showing a random access procedure of 3GPP LTE.

A UE performs a random access procedure so that a UL time alignment is acquired with respect to a BS or a UL radio resource is allocated. FIG. 9 is a flowchart showing a random access procedure of 3GPP LTE.

A UE receives a root index and a physical random access channel (PRACH) configuration index from a BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

The UE transmits a randomly selected random access preamble to the BS (step S910). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (step S920). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

The RAR may include a timing advance command (TAC), a UL grant, and a temporary C-RNTI. The TAC is information indicating a time alignment value sent by a BS to a UE to maintain a UL time alignment. The UE updates UL transmission timing by using the time alignment value. When the UE updates the time alignment, a time alignment timer starts or restarts. The UE can perform a UL transmission only when the time alignment timer is running.

Upon receiving the random access response, the UE transmits a scheduled message to the BS according to a UL grant included in the RAR (step S930).

Meanwhile, the random access procedure may be initiated by a higher layer of the UE, or may be initiated by a PDCCH order of the BS. That is, the BS may instruct a transmission of a random access preamble to maintain a UL time alignment with the UE. If the random access procedure is initiated by the PDCCH order in an $n^{th}$ subframe, the UE transmits the random access preamble in an $(n+k)^{th}$ subframe (where k>1).

Referring back to FIG. 8, the UE transmits the random access preamble to the BS through a PRACH in the $n^{th}$ subframe. The random access preamble may be based on the random access procedure indicated by the PDCCH order transmitted from the BS in an $(n-k)^{th}$ subframe (where k>1). The UE may expect a response for the random access preamble, that is, a random access response, in an $(n+r)^{th}$ DL subframe.

Apart from this, the CSI reporting may be scheduled in an $n^{th}$ UL subframe.

In case of FIG. 8, the random access response is relatively more important than the CSI reporting. Therefore, a half-duplex device may be configured such that a random access response has a higher priority than the CSI reporting, and may receive the random access response through a DL channel at a corresponding time.

In particular, if the BS initiates the random access procedure through the PDCCH order, the BS may not expect to receive the CSI reporting. This is because the CSI reporting cannot be received in a case where a UL time alignment is not maintained, and the BS instructs a corresponding UE to initiate the random access procedure if it is determined that the UL time alignment is not maintained with respect to a specific UE.

The aforementioned concept can be further extended so that the PDCCH has a higher priority than other UL channels. That is, if it is expected to receive the PDCCH in an uplink at the same time and a PUSCH or PUCCH transmission is scheduled in a downlink, a half-duplex device preferentially performs the PDCCH reception. The PDCCH, the PUSCH, and the PUCCH may respectively include a random access response, aperiodic CSI reporting, and periodic CSI reporting.

Figure 10:
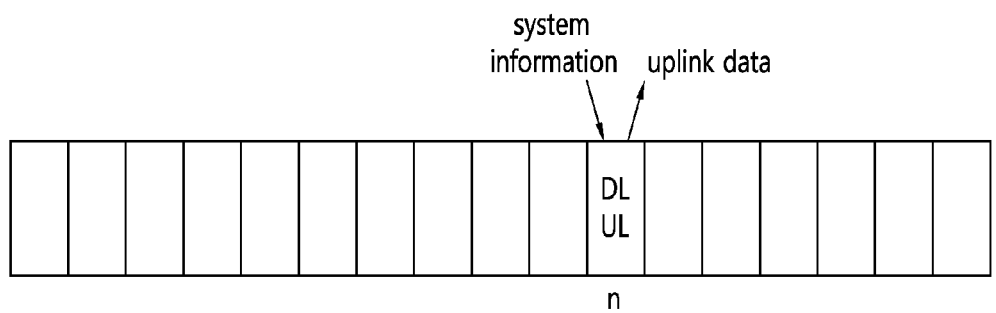
FIG. 10 shows an example in which a system information reception and a UL data transmission are scheduled at the same time.

FIG. 10 shows an example in which a system information reception and a UL data transmission are scheduled at the same time.

In an LTE system, system information may be classified into MIB and SIB. The MIB is transmitted through a PBCH at a subframe #0 in all radio frames, and includes essential parameters required by a UE to initially access a cell. The SIB is transmitted through a PDSCH. In particular, SIB1 is transmitted in a subframe #5 in every two radio frames, and includes a parameter for determining whether a corresponding cell is appropriate for the UE and information for time domain scheduling of another SIB.

Since the system information such as the MIB and the SIB includes essential information for configuring and operating another channel, the system information reception is very important. Therefore, if it is expected to receive the system information, the half-duplex device may receive the system information by giving up a UL data transmission in a corresponding subframe.

Meanwhile, the SIB may be repeated several times in a subframe other than a multimedia broadcast single frequency network (MBSFN) subframe, a UL subframe of a TDD system, and a subframe in which the SIB1 is transmitted, and may be updated in every specific radio frame. The BS may send a paging message to report the update of the SIB, and the UE may confirm the update of the system information by receiving the paging message.

Since it is not necessary to receive all of the repeated SIBs, if it is expected to receive the system information through a downlink at a time at which the UL data transmission is scheduled, a possible approach is as follows.

As a first approach, since the MIB and the SIB1 can be transmitted in subframes #0 and #5, the half-duplex device receives system information through a DL channel in the subframes #0 and #5 of each radio frame, and performs a data transmission through a UL channel in the other subframes.

As a second approach, the half-duplex device configures a specific threshold. If the same system information is received in a greater number of times than the threshold, the half-duplex device performs a UL data transmission. In this case, the half-duplex device may defer a reception of the system information until the system information is updated, and the update of the system information may be indicated by a paging message.

Meanwhile, if it is assumed that the BS knows whether a UE to which the paging message is transmitted is a full-duplex device or a half-duplex device, the BS may control timing of transmitting the page message according to a UE capability. For example, if the half-duplex device is scheduled to transmit UL data in a specific UL subframe, the BS may defer a transmission of the paging message in a DL subframe corresponding to the UL subframe, that is, at the same time. According to the aforementioned method, a UL data transmission through a PUCCH and/or a PUSCH is prior to a reception of a UE-specific paging message.

Similarly to the aforementioned concept, if it is assumed that the BS knows whether a UE to which a PDSCH is transmitted is a full-duplex device or a half-duplex device, the BS may control timing of transmitting the PDSCH according to a UE capability. For example, if it is expected that the half-duplex transmits an ACK/NACK signal for DL data at a specific time, the BS may defer a transmission of the PDSCH at that time. The ACK/NACK signal may be transmitted through a PUCCH or a PUSCH, and the PDSCH may be an SPS-PDSCH scheduled on the basis of SPS. According to the aforementioned method, the ACK/NACK signal is prior to the PDSCH.

Meanwhile, the ACK/NACK signal has a higher priority than an MBSFN in general. Since the BS can know an MBSFN subframe in which the UE is interested, if a half-duplex device is scheduled to transmit the interesting MBSFN subframe in an $n^{th}$ subframe, a PDSCH may not be allocated to the half-duplex device in an $(n-4)^{th}$ subframe. By applying the aforementioned method, the half-duplex device which receives the PDSCH in the $(n-4)^{th}$ subframe may determine that an $n^{th}$ transmitted MBSFN subframe is an MBSFN subframe not related to the half-duplex device.

However, in a specific scenario such as an MTC system, the MBSFN may be configured to have a higher priority than the ACK/NACK signal. In the above scenario, the MBSFN may be used to transmit special information. If the MBSFN has a higher priority than the ACK/NACK signal, the BS may not transmit a PDSCH which requires ACK/NACK in an $(n-4)^{th}$ subframe, thereby avoiding a collision of the ACK/NACK signal and the MBSFN in an $n^{th}$ subframe. If the collision occurs, since the MBSFN has a higher priority than the ACK/NACK signal, the half-duplex device does not transmit the ACK/NACK signal but receives the MBSFN subframe.

Figure 11:
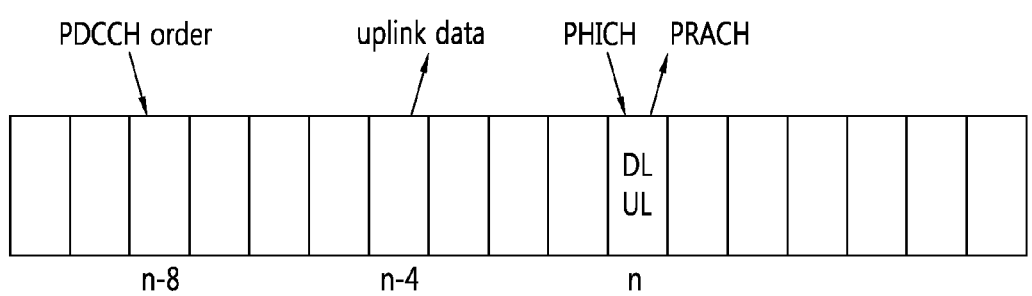
FIG. 11 shows an example in which an ACK/ NACK reception and a random access preamble transmission are scheduled at the same time.

FIG. 11 shows an example in which an ACK/NACK reception and a random access preamble transmission are scheduled at the same time.

Since a UE cannot transmit UL data through a PUSCH until an RRC connection procedure ends, there is no case where a PRACH initiated by an initial step collides with a PHICH. However, the PRACH initiated by a PDCCH order may collide with the PHICH.

For example, a half-duplex device may transmit UL data through a PUSCH in an $(n-4)^{th}$ subframe by determining that a time alignment with a BS is maintained. The PUSCH may be an SPS-PUSCH scheduled on the basis of SPS. In the above case, the half-duplex device expects to receive an ACK/NACK signal for the PUSCH through a PHICH in an $n^{th}$ subframe. Apart from this, if it is assumed that the half-duplex device receives a PDCCH order in an $(n-8)^{th}$ subframe and the a $1^{st}$ subframe in which the half-duplex device can transmit a random access preamble is an $n^{th}$ subframe, the half-duplex device transmits the random access preamble through a PRACH in the $n^{th}$ subframe.

As described above, the PDCCH order is transmitted for such a reason the BS determines that a UL time alignment of the UE is not maintained. Therefore, if the random access procedure is initiated by the PDCCH order, the half-duplex device may determine that UL data cannot be successfully transmitted through a PDSCH and may defer a transmission of the UL data in an $(n-4)^{th}$ subframe, and as a result, may not receive an ACK/NACK signal for the UL data in the $n^{th}$ subframe.

According to the aforementioned method, a transmission of the random access preamble through the PRACH is prior to a reception of the ACK/NACK through the PHICH.

Figure 12:
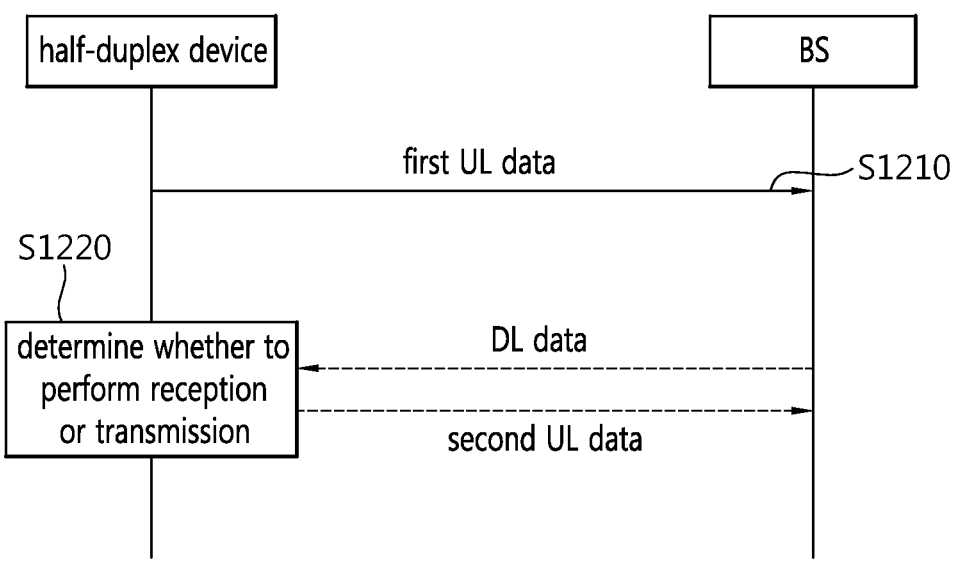
FIG. 12 is a flowchart showing a data transmission method for a half-duplex wireless device according to an embodiment of the present invention.

FIG. 12 is a flowchart showing a data transmission method for a half-duplex wireless device according to an embodiment of the present invention.

A half-duplex device transmits $1^{st}$ UL data (step S1210).

The half-duplex device determines whether to receive DL data which is a response for the $1^{st}$ UL data from a BS or to transmit $2^{nd}$ UL data to the BS (step S1220). As described above, if a UE is the half-duplex device, a DL data reception and a UL data transmission cannot be performed simultaneously. Therefore, the half-duplex device has to determine whether to perform the DL data reception or the UL data transmission.

For example, if the half-duplex device transmits the $1^{st}$ UL data through a PDCCH or a PDSCH in an $n^{th}$ UL subframe, the BS transmits an ACK/NACK signal for the $1^{st}$ UL data in an $(n+r)^{th}$ DL subframe (where r>1). Apart from this, a $2^{nd}$ UL data transmission such as CSI reporting may be scheduled in an $(n+r)^{th}$ UL subframe. In this case, the half-duplex device may defer a transmission of the $2^{nd}$ UL data and may determine to receive the ACK/NACK signal, that is, DL data.

For example, if the half-duplex device transmits a random access preamble, i.e., the $1^{st}$ UL data, through the PRACH in the $n^{th}$ UL subframe, the BS may transmit a random access response in an $(n+r)^{th}$ DL subframe (where r>1). The random access preamble may be based on a random access procedure initiated on the basis of a PDCCH order received from the BS in an $(n-k)^{th}$ DL subframe (where k>1). Apart from this, a transmission of the $2^{nd}$ UL data such as CSI reporting may be scheduled in an $(n+r)^{th}$ UL subframe. In this case, the half-duplex device may defer the transmission of the $2^{nd}$ UL data and may determine to receive a random access response, that is, DL data.

For example, if the half-duplex device transmits the $1^{st}$ UL data through the PUSCH in the $n^{th}$ UL subframe, the BS transmits an ACK/NACK signal for the $1^{st}$ UL data in an $(n+r)^{th}$ DL subframe (where r>1). Apart from this, a transmission of the random access preamble may be scheduled in an $(n+r)^{th}$ UL subframe. The random access preamble may be based on a random access procedure initiated on the basis of a PDCCH order received from the BS in an $(n-k)^{th}$ DL subframe (where k>1). In this case, the half-duplex device may defer a reception of the ACK/NACK signal, i.e., DL data, for the $1^{st}$ UL data and may determine to transmit a random access preamble, i.e., the $2^{nd}$ UL data.

Figure 13:
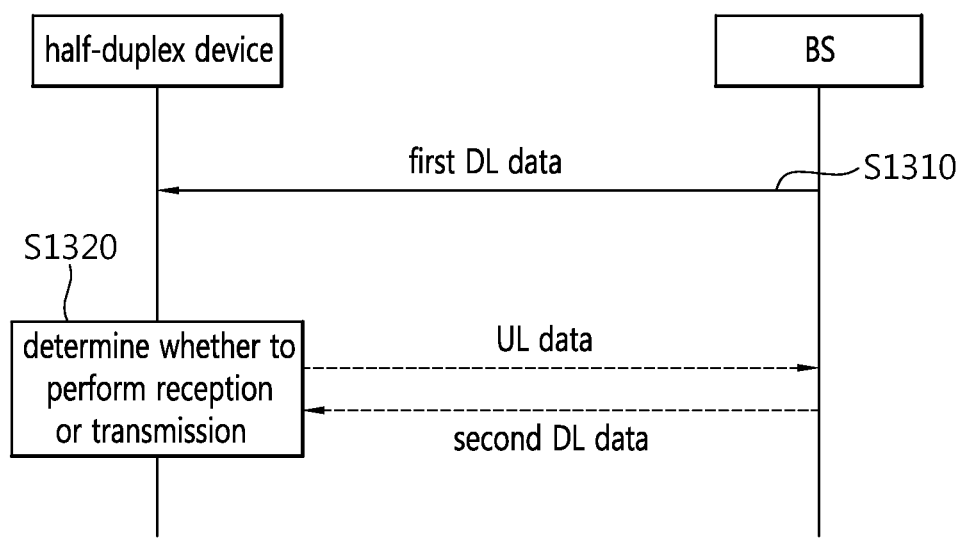
FIG. 13 is a flowchart showing a data transmission method for a half-duplex wireless device according to another embodiment of the present invention.

FIG. 13 is a flowchart showing a data transmission method for a half-duplex wireless device according to another embodiment of the present invention.

A half-duplex device receives $1^{st}$ DL data from a BS (step S1310).

The half-duplex device determines whether to transmit UL data generated based on the $1^{st}$ DL data to the BS or to receive $2^{nd}$ DL data from the BS (step S1320).

For example, the half-duplex device may acquire a UL grant for an $(n+r)^{th}$ DL subframe (where r>1) through a PDCCH in an $n^{th}$ DL subframe. Apart from this, system information such as MIB, SIB, and paging messages may be received in the $n^{th}$ DL subframe. In this case, the half-duplex device may defer a UL data transmission and may determine to receive the system information, that is, $2^{nd}$ DL data. Alternatively, which operation will be performed between a transmission of the UL data and a reception of the $2^{nd}$ DL data may be determined on the basis of a subframe and/or a system information type.

Figure 14:
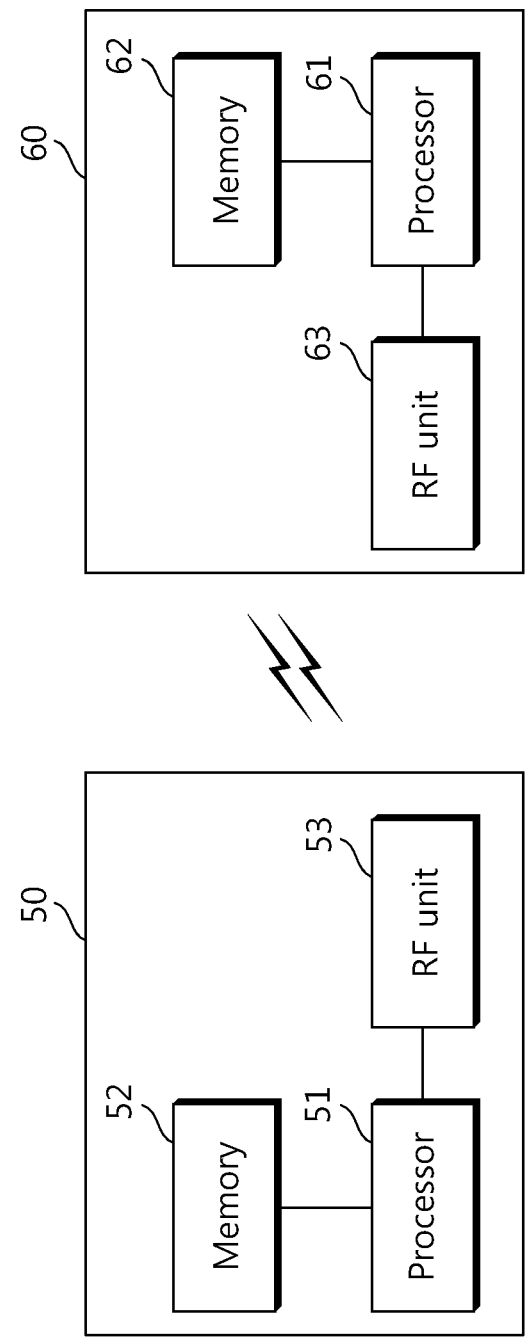
FIG. 14 is a block diagram showing a wireless communication system according to an embodiment of the present invention.

FIG. 14 is a block diagram showing a wireless communication system according to an embodiment of the present invention.

ABS 50 includes a processor 51, a memory 52, and a radio frequency (RF) unit 53. The memory 52 operatively coupled to the processor 51 stores a variety of information for driving the processor 51. The RF unit 53 operatively coupled to the processor 51 transmits and/or receives a radio signal. The processor 51 implements the proposed functions, procedures, and/or methods. In the aforementioned embodiment, an operation of the BS may be implemented by the processor 51.

A UE 60 includes a processor 61, a memory 62, and an RF unit 63. The memory 62 operatively coupled to the processor 61 stores a variety of information for driving the processor 61. The RF unit 63 operatively coupled to the processor 61 transmits and/or receives a radio signal. The processor 61 implements the proposed functions, procedures, and/or methods. In the aforementioned embodiment, an operation of the UE may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A data transmission method for a half-duplex device in a wireless communication system, the method comprising:
   transmitting, by the half-duplex device, first uplink (UL) data to a base station (BS) in an n-th subframe; and
   determining, by the half-duplex device, to receive downlink (DL) data from the BS in an (n+r)-th subframe, where r>1, and to transmit second UL data to the BS in the (n+r)-th subframe,
   wherein the DL data is a response for the first UL data, and
   wherein the determining comprises:
      determining to receive the DL data in the (n+r)-th subframe when the DL data includes an acknowledgement (ACK)/negative acknowledgement (NACK) signal for the first UL data and the second UL data includes channel state information (CSI) reporting, and
      determining to transmit the second UL data in the (n+r)-th subframe when the DL data includes an ACK/NACK signal for the first UL data and the second UL data includes a random access preamble,
      otherwise the determining comprises determining to transmit the second UL data to the BS in the (n+r)-th subframe.

2. The method of claim 1, wherein if the first UL data includes a random access preamble and the DL data includes a random access response and the second UL data includes CSI reporting, the half-duplex device determines to receive the DL data in the (n+r)-th subframe.

3. The method of claim 2, wherein the first UL data is based on a random access procedure initiated by a physical downlink control channel (PDCCH) order received from the BS in an (n-k)-th subframe, where k>1.

4. The method of claim 2, wherein the CSI reporting is periodic CSI reporting.

5. A half-duplex device in a wireless communication system, the device comprising:
   a radio frequency (RF) unit configured to transmit and receive a radio signal;
   a processor operatively coupled to the RF unit and configured to:

transmit first uplink (UL) data to a base station (BS) in an n-th subframe; and determine to receive downlink (DL) data from the BS in an (n+r)-th subframe, where r>1, and to transmit second UL data to the BS in the (n+r)-th subframe, wherein the DL data is a response for the first UL data, and wherein the processor:

determines to receive the DL data in the (n+r)-th subframe when the DL data includes an ACK/NACK signal for the first UL data and the second UL data includes channel state information (CSI) reporting, and determines to transmit the second UL data in the (n+r)-th subframe when the DL data includes an ACK/NACK signal for the first UL data and the second UL data includes a random access preamble, otherwise the processor determines to transmit the second UL data in the (n+r)-th subframe.

6. The device of claim 5, wherein if the first UL data includes a random access preamble, the DL data includes a random access response and the second UL data includes CSI reporting, the processor is configured to determine to receive the DL data in the (n+r)-th subframe.

7. The device of claim 6, wherein the first UL data is based on a random access procedure initiated by a PDCCH order received from the BS in an (n−k)-th subframe, where k>1.

* * * * *